US011294782B1

(12) United States Patent
Charles et al.

(10) Patent No.: US 11,294,782 B1
(45) Date of Patent: Apr. 5, 2022

(54) FAILOVER AFFINITY RULE MODIFICATION BASED ON NODE HEALTH INFORMATION

(71) Applicant: EMC IP Holding Company LLC, Hopkinton, MA (US)

(72) Inventors: Peniel Charles, Bangalore (IN); Shashidhar R. Kulkarni, Bangalore (IN); Manikandan Sethuraman, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/207,992

(22) Filed: Mar. 22, 2021

(51) Int. Cl.
*G06F 11/20* (2006.01)
*G06F 11/34* (2006.01)
*G06F 11/30* (2006.01)

(52) U.S. Cl.
CPC ...... *G06F 11/2094* (2013.01); *G06F 11/3006* (2013.01); *G06F 11/3495* (2013.01); *G06F 2201/85* (2013.01)

(58) Field of Classification Search
CPC ............ G06F 11/2094; G06F 11/3006; G06F 11/3495; G06F 2201/85
USPC .................................. 714/6.3, 4.11
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,694,166 B1 * | 4/2010 | Suggs ................. G06F 11/2025 714/4.11 |

(Continued)

FOREIGN PATENT DOCUMENTS

| | | | |
|---|---|---|---|
| CN | 105162824 A | * 12/2015 | ......... H04L 41/0668 |
| CN | 103677927 B | 2/2017 | |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Chae M Ko
(74) *Attorney, Agent, or Firm* — Ryan, Mason & Lewis, LLP (57) ABSTRACT

An apparatus comprises a processing device comprising a processor coupled to memory. The processing device is configured to obtain failover information corresponding to a first node of a plurality of nodes where each node is configured to communicate with a storage system over a plurality of paths. The failover information comprises a failover node selection order according to which other nodes of the plurality of nodes are configured for selection in response to the first node becoming unavailable. The processing device is configured to determine that health information corresponding to a given node indicates that the given node is exhibiting performance issues on at least one of the paths and to modify the failover node selection order based at least in part on the determination.

20 Claims, 5 Drawing Sheets

| MODIFIED FAILOVER AFFINITY RULE FOR NODE 102-1 ||
|---|---|
| 1. | NODE 102-3 |
| 2. | NODE 102-2 |

500

(56) References Cited

U.S. PATENT DOCUMENTS

| | | | |
|---|---|---|---|
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,520,533 B1* | 8/2013 | Gill | H04L 43/0811 370/242 |
| 8,751,698 B1* | 6/2014 | Sachdev | G06F 11/0781 710/16 |
| 8,825,919 B1 | 9/2014 | Lim et al. | |
| 8,832,334 B2 | 9/2014 | Okita | |
| 8,874,746 B1 | 10/2014 | Gonzalez | |
| 8,918,537 B1* | 12/2014 | Sandstrom | H04L 12/6418 709/224 |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 10,911,402 B2 | 2/2021 | Pusalkar et al. | |
| 2002/0023151 A1 | 2/2002 | Iwatani | |
| 2002/0103923 A1 | 8/2002 | Cherian et al. | |
| 2002/0188711 A1* | 12/2002 | Meyer | G06F 11/2089 709/224 |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2007/0294562 A1* | 12/2007 | Takamatsu | G06F 11/3433 714/4.1 |
| 2008/0043973 A1 | 2/2008 | Lai et al. | |
| 2008/0201458 A1 | 8/2008 | Salli | |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0019315 A1* | 1/2020 | Chadwell | G06F 3/0662 |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |
| 2021/0019054 A1 | 1/2021 | Anchi et al. | |
| 2021/0026551 A1 | 1/2021 | Tidke et al. | |
| 2021/0026650 A1 | 1/2021 | Rao et al. | |
| 2021/0255795 A1* | 8/2021 | Lin | G06F 3/0653 |
| 2021/0336839 A1* | 10/2021 | He | H04L 41/5051 |

FOREIGN PATENT DOCUMENTS

| | | | |
|---|---|---|---|
| EP | 1117028 A2 | 7/2001 | |
| EP | 2667569 A1 | 11/2013 | |
| WO | PCT/US2019/052549 | 12/2019 | |
| WO | PCT/US2019/053204 | 12/2019 | |
| WO | PCT/US2019/053473 | 12/2019 | |
| WO | PCT/US2019/067144 | 5/2020 | |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

Vmware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

Microsoft Docs, "Failover Behavior on Clusters of Three or More Nodes," https://docs.microsoft.com/en-us/troubleshoot/windows-server/high-availability/groups-fail-logic-three-more-cluster-node-members, Sep. 21, 2020, 4 pages.

Microsoft Docs, "SetClusterGroupNodeList Function," https://docs.microsoft.com/en-us/windows/win32/api/clusapi/nf-clusapi-setclustergroupnodelist, Dec. 5, 2018, 3 pages.

Microsoft Docs, "Failover Cluster Administrator Extension DLLs," https://docs.microsoft.com/en-us/previous-versions/windows/desktop/mscs/cluster-administrator-extension-dlls, May 31, 2018, 1 page.

U.S. Appl. No. 16/697,393, filed in the name of Vinay G. Rao et al. on Nov. 27, 2019, and entitled "Automated Seamless Migration of Logical Storage Devices."

(56) References Cited

OTHER PUBLICATIONS

U.S. Appl. No. 16/710,828, filed in the name of Amit Pundalik Anchi et al. on Dec. 11, 2019, and entitled "Automated Seamless Migration with Signature Issue Resolution."

* cited by examiner

| FAILOVER AFFINITY RULE FOR NODE 102-1 |
|---|
| 1. NODE 102-2 |
| 2. NODE 102-3 |

| FAILOVER AFFINITY RULE FOR NODE 102-4 |
|---|
| 1. NODE 102-2 |
| 2. NODE 102-1 |

| MODIFIED FAILOVER AFFINITY RULE FOR NODE 102-1 |
|---|
| 1. NODE 102-3 |
| 2. NODE 102-2 |

| MODIFIED FAILOVER AFFINITY RULE FOR NODE 102-4 |
|---|
| 1. NODE 102-1 |
| 2. NODE 102-2 |

FAILOVER AFFINITY RULE MODIFICATION BASED ON NODE HEALTH INFORMATION

FIELD

The field relates generally to information processing systems, and more particularly to node failover in information processing systems.

BACKGROUND

Some failover clusters comprise groups of nodes that work together to increase the availability and scalability of applications and services. Clustered nodes are configured to have shared access to the logical units or volumes (LUNs) of a storage system via a storage area network (SAN) fabric. If one of the cluster nodes fails, other nodes in the cluster typically take over execution of the applications and services that were executing on that node, a process sometimes referred to as failover.

SUMMARY

In one embodiment, an apparatus comprises a processing device comprising a processor coupled to memory. The processing device is configured to obtain failover information corresponding to a first node of a plurality of nodes. Each node of the plurality of nodes is configured to communicate with a storage system over a plurality of paths. The failover information comprises a failover node selection order according to which other nodes of the plurality of nodes are configured for selection in response to the first node becoming unavailable. The processing device is configured to obtain health information corresponding to a given node of the other nodes and to determine that the health information indicates that the given node is exhibiting performance issues on at least one of the paths between the given node and the storage system. The processing device is configured to modify the failover node selection order based at least in part on the determination that the health information indicates that the given node is exhibiting performance issues on the at least one of the paths.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
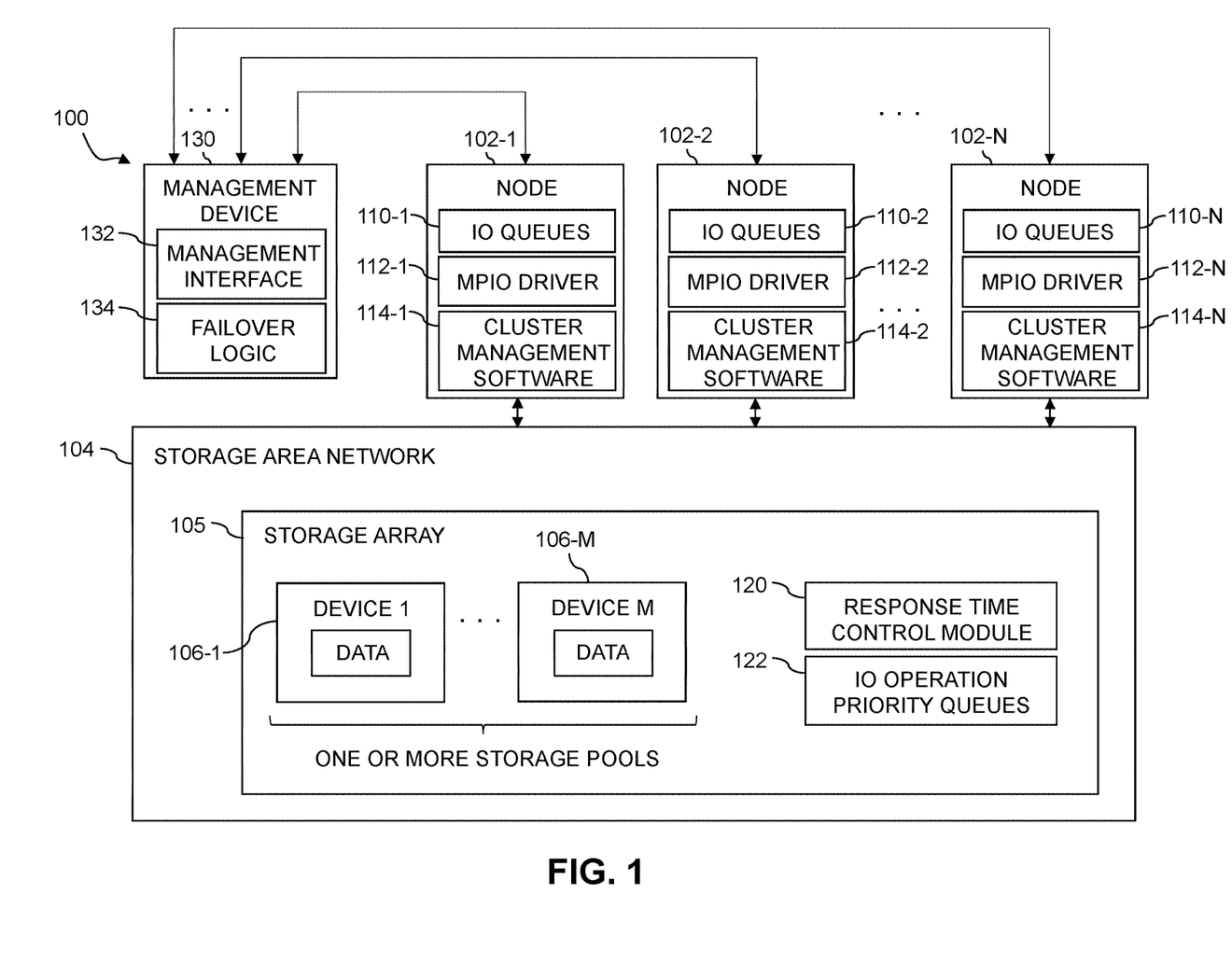
FIG. 1 is a block diagram of an information processing system configured with functionality for node failover in an illustrative embodiment.

FIG. 1 shows an information processing system 100 configured in accordance with an illustrative embodiment. The information processing system 100 comprises a plurality of nodes 102-1, 102-2, ... 102-N, referred to herein collectively as nodes 102. In some cases, nodes 102 may also or alternatively be referred as servers or host devices. The nodes 102 communicate over a storage area network (SAN) 104 with at least one storage array 105. The storage array 105 comprises a plurality of storage devices 106-1, ... 106-M each storing data utilized by one or more applications running on one or more of the nodes 102. The storage devices 106 are illustratively arranged in one or more storage pools. The storage array 105 and its associated storage devices 106 is an example of what is more generally referred to herein as a "storage system." This storage system in the present embodiment is shared by the nodes 102, and is therefore also referred to herein as a "shared storage system."

The nodes 102 and storage array 105 may also communicate with a management device 130 either over the SAN 104 or over one or more other network connections. For example, in some embodiments, the nodes 102, the storage array 105, or both may communicate with the management device 130 over one or more network connections that are separate and distinct from the SAN 104. Management device 130 is configured to monitor the nodes 102 and to obtain information about the nodes 102 and their usage of the storage array 105. Management device 130 also comprises a management interface 132, e.g., a graphical user interface, that may be presented to a user such as, e.g., an administrator, to provide the information to the user. In some embodiments, one or more of nodes 102 may comprise the management device 130.

The nodes 102 illustratively comprise respective computers, servers or other types of processing devices capable of communicating with the storage array 105 of the SAN 104. For example, at least a subset of the nodes 102 may be implemented as respective virtual machines of a compute services platform or other type of processing platform. The nodes 102 in such an arrangement illustratively provide compute services such as execution of one or more applications on behalf of each of one or more users associated with respective ones of the nodes 102. The term "user"

herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement LUNs configured to store objects for users associated with the nodes 102. These objects can comprise files, blocks or other types of objects. In illustrative embodiments, the storage devices 106 may comprise one or more clusters of storage devices 106. The nodes 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the nodes 102 illustratively has multiple IO paths to the storage array 105, with at least one of the storage devices 106 of the storage array 105 being visible to that node on a given one of the paths. A given one of the storage devices 106 may be accessible to the given node over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the nodes 102.

The nodes 102, SAN 104, storage array 105 and management device 130 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The nodes 102, the storage array 105 and the management device 130 may be implemented on respective distinct processing platforms, although numerous other arrangements are possible. For example, in some embodiments at least portions of the nodes 102, the storage array 105 and the management device 130 are implemented on the same processing platform. The storage array 105 can therefore be implemented at least in part within at least one processing platform that implements at least a subset of the nodes 102 and the management device 130.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The nodes 102 comprise respective sets of IO queues 110-1, 110-2, . . . 110-N and respective MPIO drivers 112-1, 112-2, . . . 112-N. The MPIO drivers 112 collectively comprise a multi-path layer of the nodes 102. In some embodiments, the nodes 102 may also comprise respective cluster management software 114-1, 14-2, . . . 114-N, which may be collectively and individually referred to herein as cluster management software 114, that is configured to manage the cluster of the nodes 102. While all of the nodes 102 are illustrated in FIG. 1 as comprising cluster management software 114, cluster management software 114 may alternatively be implemented on only one of the nodes 102 or any other sub-set of the nodes 102.

MPIO drivers typically group all paths from a node to a logical volume into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other available paths in the multi-path logical device.

Paths may be added or deleted between the nodes 102 and the storage array 105 in the system 100. For example, the addition of one or more new paths from node 102-1 to the storage array 105 or the deletion of one or more existing paths from the node 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In some embodiments, paths are added or deleted in conjunction with the addition of a new communication adaptor or the removal of an existing communication adaptor from the node.

In these and other situations, path discovery scans may be performed by the MPIO drivers of the multi-path layer as needed in order to discover the addition of new paths or the deletion of existing paths. A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the nodes 102 is configured to execute a host registration operation for that path. The host registration operation for a given new path illustratively provides notification to the storage array 105 that the corresponding one of the nodes 102 has discovered the new path.

The MPIO drivers utilize the multiple paths described above to send IO operations from the nodes 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the node 102-1. Other types of sources of IO operations may be present in a given implementation of system 100.

The MPIO drivers described herein may comprise, for example, otherwise conventional MPIO drivers, such as PowerPath® drivers from Dell Technologies, suitably modified in the manner disclosed herein to implement at least a portion of functionality for node failover. Other types of MPIO drivers from other driver vendors may be suitably modified to incorporate at least a portion of functionality for node failover as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which issued as U.S. Pat. No. 10,474,367 on Nov. 12, 2019, the entirety of which is incorporated by reference herein.

As mentioned above, communications between the nodes 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the nodes 102 and management device 130 are possible, in which certain ones of the nodes 102 and management device 130 reside in one data center in a first geographic location while other ones of the nodes 102 and management device 130 reside in one or more other data centers in one or more other geographic locations that are potentially remote from the first geographic location. Thus, it is possible in some implementations of the system 100 for different ones of the nodes 102 and management device 130 to reside in different data centers than the storage array 105.

Numerous other distributed implementations of the nodes 102, management device 130 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as nodes 102, SAN 104, storage array 105, storage devices 106, sets of IO queues 110, MPIO drivers 112, management device 130, management interface 132 and failover logic 134 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

In a node running multipath software, the multipath layer typically sits above the SCSI and HBA layers. When the multipath layer dispatches an IO operation, it first goes to the SCSI layer, then the HBA Layer and then is conveyed down the communication link to a port of the storage array.

Figure 2:
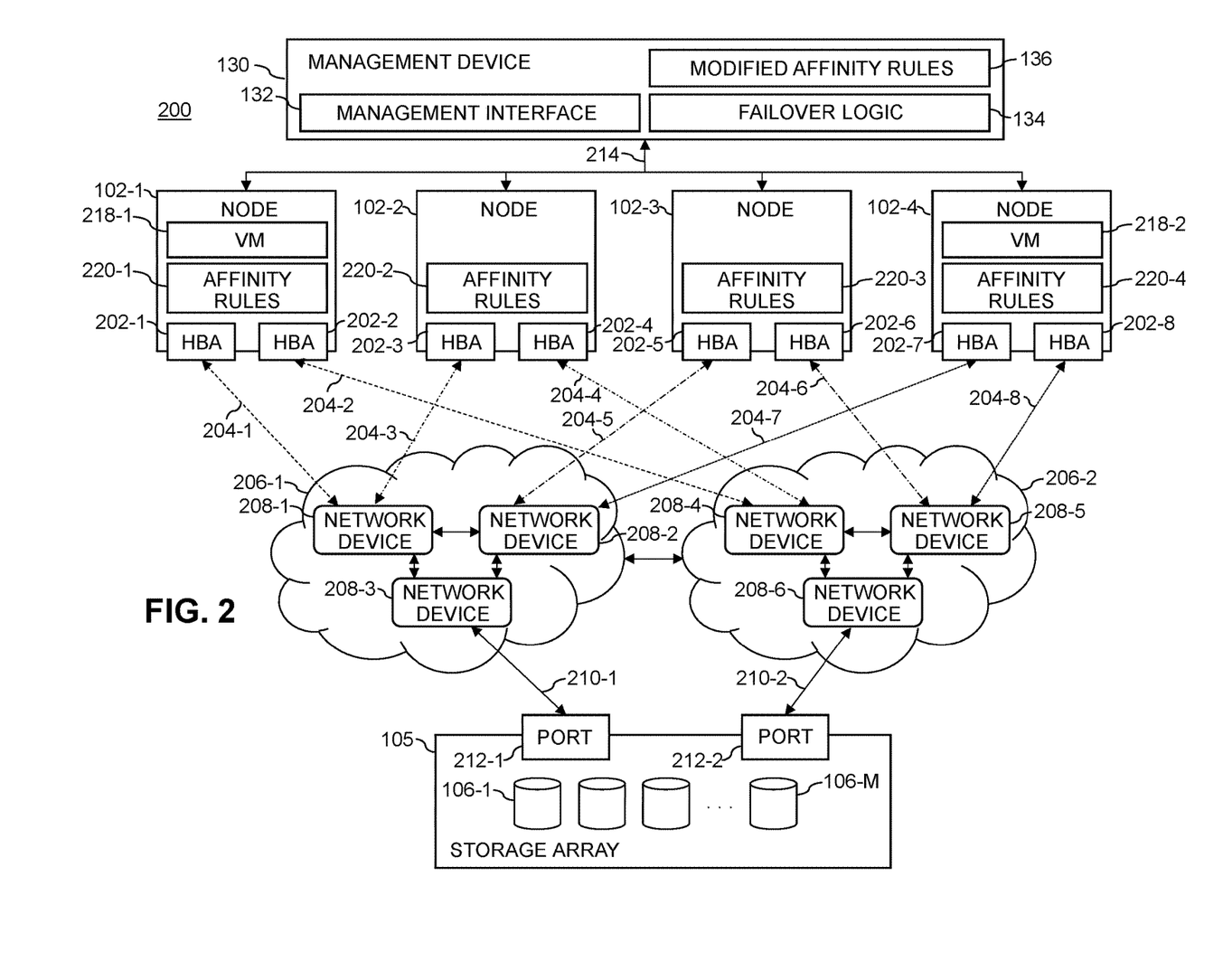
FIG. 2 is a block diagram illustrating an example configuration of the information processing system of FIG. 1 in an illustrative embodiment.

With reference now to FIG. 2, an example configuration 200 of information processing system 100 is illustrated. In FIG. 2, each of the nodes 102-1, 102-2, 102-3 and 102-4 communicates with the storage array 105 via a plurality of paths which utilize a combination of network interfaces 202, e.g., hardware bus adapters (HBAs), communication links 204-1, 204-2, 204-3, 204-4, 204-5, 204-6, 204-7 and 204-8, networks 206-1 and 206-2, network devices 208-1, 208-2, 208-3, 208-4, 208-5 and 208-6, e.g., switches, routers or other network devices, communication links 210-1 and 210-2 and ports 212-1 and 212-2.

Nodes 102-1, 102-2, 102-3 and 102-4 may be collectively and individually referred to herein as node(s) 102. Network interfaces 202-1, 202-2, 202-3, 202-4, 202-5, 202-6, 202-7 and 202-8 may be collectively and individually referred to herein as network interface(s) 202 and are shown in the example of FIG. 2 as HBAs. Communication links 204-1, 204-2, 204-3, 204-4, 204-5, 204-6, 204-7 and 204-8 may be collectively and individually referred to herein as communication link(s) 204. Networks 206-1 and 206-2 may be collectively and individually referred to herein as network(s) 206. Network devices 208-1, 208-2, 208-3, 208-4, 208-5 and 208-6 may be collectively and individually referred to herein as network device(s) 208. Communication links 210-1 and 210-2 may be collectively and individually referred to herein as communication link(s) 210. Ports 212-1 and 212-2 may be collectively and individually referred to herein as port(s) 212.

While the example configuration 200 of FIG. 2 only illustrates four nodes 102 each having two network interfaces 202, six network devices 208, two ports 212, and a number of communication links 204 and 210, any other number of each of these components may also be present in the information processing system 100 and utilized to provide communications between the nodes 102 and the storage array 105. For example, in some embodiments a single network 206 may comprise some or all of the network devices 208. In addition, while cluster management software 114 (FIG. 1) is not shown in FIG. 2, it is understood that cluster management software 114 may be implemented by any or all of nodes 102-1, 102-2, 102-3 or 102-4, by management device 130 or by another node of the information processing system 100 that is not shown in the example configuration 200 of FIG. 2.

In the example configuration 200, node 102-1 is connected to network device 208-1 of network 206-1 using network interface 202-1 and communication link 204-1. Node 102-1 is also connected to network device 208-4 using network interface 202-2 and communication link 204-2. The other nodes 102 are similarly connected to the network devices 208 of the networks 206 via respective network interfaces 202 and communication links 204 as shown in FIG. 2.

The network devices 208 within a given network 206 are configured to communicate with each other within the given network 206, e.g., via intra-network communication links such as wired or wireless communication links. For example, in network 206-1, network devices 208-1, 208-2 and 208-3 may communicate with each other via intra-network communication links as shown in FIG. 2. In some embodiments, one or more communication links between networks 206-1 and 206-2 may also be present to facilitate communication between networks 206-1 and 206-2 as shown, for example, in FIG. 2. The intra-network communication links and communication links between networks are not numbered herein for brevity and clarity in the figure.

As shown in FIG. 2, network device 208-1, which communicates with node 102-1 via communication link 204-1, does not communicate directly with storage array 105 via a corresponding communication link. Instead, network device 208-1 communicates with another network device within the network 206-1, e.g., network device 208-3 which is then configured to communicate with the storage array 105 via communication link 210-1 and port 212-1. In other embodiments, the same network device 208 may alternatively communicate with both the node 102 and the storage array 105 via corresponding communication links 204 and 210 without requiring the use of an intermediary network device 208.

A given path between a node 102 and the storage array 105 utilizes one of the network interfaces 202, one of the communication links 204, one or more of the network devices 208, one of the communication links 210 and one of the ports 212. Each network interface 202, e.g., HBA, may be described as an initiator of a path. Each port 212 may likewise be described as a target of a path.

As shown in the example configuration 200 of FIG. 2, there are two paths from each node 102 to the storage array 105.

For example, a first path between node 102-1 and storage array 105 may comprise network interface 202-1, the initiator of the path, communication link 204-1, network device 208-1, network device 208-3, communication link 210-1 and port 212-1. A second path between node 102-1 and storage array 105 may comprise network interface 202-2, the initiator of the path, communication link 204-2, network device 208-4, network device 208-6, communication link 210-2 and port 212-2.

As another example, a first path between node 102-3 and storage array 105 may comprise network interface 202-5, communication link 204-5, network device 208-2, network device 208-3, communication link 210-1 and port 212-1. A second path between node 102-3 and storage array 105 may comprise network interface 202-6, communication link 204-6, network device 208-5, network device 208-6, communication link 210-2 and port 212-2.

The available paths between the nodes 102-2 and 102-4 and the storage array 105 may be described in a similar manner, for example, as shown in the example configuration 200 of FIG. 2.

In example configuration 200, there are eight available paths between the nodes 102 and storage array 105. In other examples embodiments, where there is a smaller or larger number of nodes 102, network interfaces 202, communication links 204, networks 206, network devices 208, communication links 210 or ports 212 between the nodes 102 and the storage array 105, a smaller or larger number of paths may alternatively be available.

As seen in FIG. 2, each of the nodes 102 may also communicate with management device 130. For example, nodes 102 may communicate with management device 130 using one or more communication links 214. Communication links 214 may be utilized by the nodes 102 to provide information about the nodes 102 and their connections with the storage array 105 to the management device 130. The communication links 214 may also be utilized by the management device 130 to provide commands or instructions to the nodes 102. In some embodiments, communication links 214 may be separate from SAN 104. In some embodiments, SAN 104 may comprise communication links 214.

In an example scenario, with reference now to FIGS. 1 and 2, node 102-1 hosts a VM application 218-1 and node 102-4 hosts a VM application 218-2. The cluster of nodes 102-1 through 102-4 implements cluster affinity rules which are duplicated to each node 102-1 through 102-4 by cluster management software 114 as respective affinity rules 220-1, 220-2, 220-3 and 220-4, which may be referred to herein individually and collectively as affinity rules 220. The affinity rules 220 manage failover in the event of a failed node 102. For example, the affinity rules 220 stored on each node 102 may comprise the affinity rules 220 for the failover of each of the nodes 102 in the cluster, e.g., nodes 102-1, 102-2, 102-3 and 102-4 in the example configuration 200 of FIG. 2.

Figure 3:
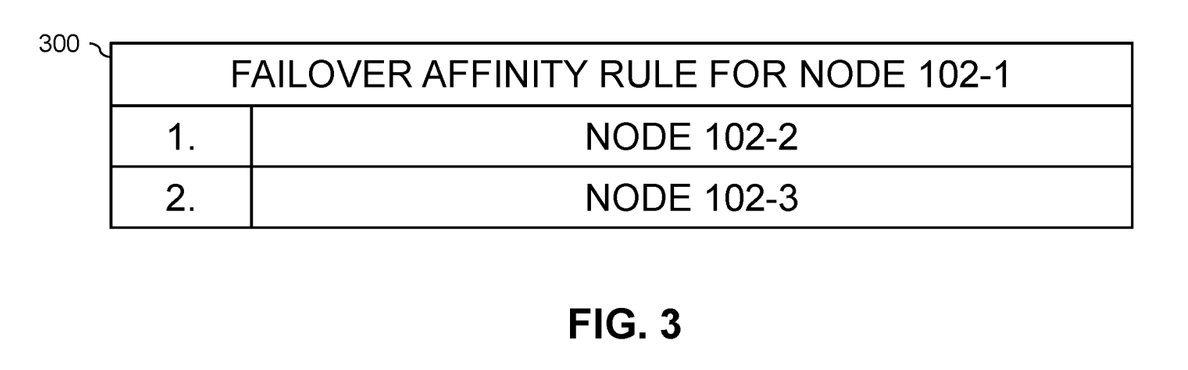
FIG. 3 is an illustration of an example of an affinity rule for a first node failover in an illustrative embodiment.
Figure 4:
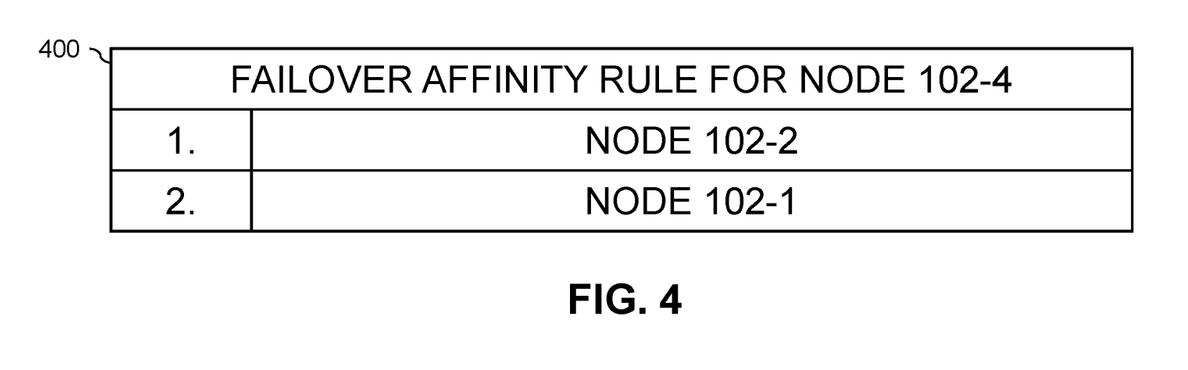
FIG. 4 is an illustration of an example of an affinity rule for a second node failover in an illustrative embodiment.

In one example scenario, with reference to FIGS. 3 and 4, the affinity rules 220 may comprise an affinity rule 300 for the failover of node 102-1 and an affinity rule 400 for the failover of node 102-4. As seen in affinity rule 300 of FIG. 3, any application running on node 102-1 will failover to node 102-2 or node 102-3 in the event of a failure in node 102-1. As seen in affinity rule 400 of FIG. 4, any application running on node 102-4 will failover to node 102-2 or node 102-1 in the event of a failure in node 102-4. In an illustrative embodiment, the failover occurs according to the order in the corresponding affinity rule. For example, according to affinity rule 300, in response to a failure of node 102-1, the nodes 102 will first attempt to transfer the applications that were running on node 102-1, including VM application 218-1, to node 102-2. If node 102-2 is unavailable or otherwise unable to accept the transfer, the nodes 102 will then attempt to transfer the applications to node 102-3. In another example, according to affinity rule 400, in response to a failure of node 102-4, the nodes 102 will first attempt to transfer the applications that were running on node 102-4, including VM application 218-2, to node 102-2. If node 102-2 is unavailable or otherwise unable to accept the transfer, the nodes 102 will then attempt to transfer the applications to node 102-1.

In the example scenario, the MPIO driver 112-2 installed on node 102-2 monitors the status of the paths between the network interfaces 202-3 and 202-4 of node 102-2 and the storage array 105 and determines that the paths that utilize network interface 202-3 of node 102-2 have been exhibiting inconsistent performance, sometimes also referred to as being "flaky." For example, the MPIO driver 112-2 may determine based on the monitoring that the paths that utilize the network interface 202-3 of node 102-2 have been experiencing high latency, intermittent connection failures or other similar issues that are impacting the performance and ability of the node 102-2 to service IO operations using network interface 202-3. Based on this determination, the MPIO driver 112-2 instead routes IO operations from node 102-2 to the storage array 105 via the network interface 202-4.

When utilizing the affinity rules 220 during failover, a failure or other issue with node 102-1 may result in a failover of VM application 218-1 to node 102-2 or node 102-3 according to the affinity rule 300 shown in FIG. 3. However, the cluster management software 114 that handles the failover is not aware that the network interface 202-3 of node 102-2 is encountering performance issues and is considered to be flaky. In this situation, if the failover moves VM application 218-1 to node 102-2, reduced application performance may be experienced due to the flaky paths and network interface 202-3. In addition, if node 102-2 experiences multiple path failures or higher latency when using the remaining network interface 202-4, the performance may become further degraded since there is no other network interface available on which to route 10 operations from node 102-2 to the storage array 105.

In illustrative embodiments, the MPIO drivers 112 installed on nodes 102 such as nodes 102-1 through 102-4 comprise functionality to monitor the network interfaces 202 of the nodes 102. The MPIO drivers 112 are also configured to obtain information that identifies the nodes 102 and LUNs where the VM applications 218 are hosted and comprises affinity rules for transferring the VM applications 218 between the nodes 102 in the event of a failover, e.g., from the cluster management software 114 of the cluster. As mentioned above, cluster management software 114 may be implemented by one of the nodes 102 or on a separate node of the information processing system 100.

The MPIO drivers 112 are configured to pass the obtained information to a multi-path management application (MPMA), e.g., an application running on one of the nodes 102 or on a separate node of the cluster such as, e.g., management device 130. For example, in illustrative embodiments, the failover logic 134 of management device 130 comprises the MPMA. The MPMA is also configured to obtain a path status of each path to the cluster LUNs from the MPIO drivers 112 of the nodes 102. The path status of each path may comprise, for example, a state or status of the path, a latency of the path, a flakiness of the path, an IO load on the path, SAN Fabric details for the path, e.g., which network device 208 the path utilizes, or other information about paths between the nodes 102 and the LUNs of the storage array 105.

The affinity rules 220 may comprise lists of nodes 102 from which the failover for a particular node 102 may be determined and selected. In some embodiments, the MPMA is configured to rank or re-rank the listing of nodes 102 which are part of the affinity rule for the particular nodes 102 and store the ranked lists as modified affinity rules 136. For example, the MPMA may modify the affinity rules in view of the path status obtained from each MPIO driver 112. If a node 102 has a path or network interface 202 that is indicated to be flaky or has other performance issues in its path status the MPMA may move that node 102 further down the failover list in the modified affinity rules 136 such that, in the event of a failover in one of the nodes 102, another node 102 that does not have these path performance issues will be selected.

Figure 5:
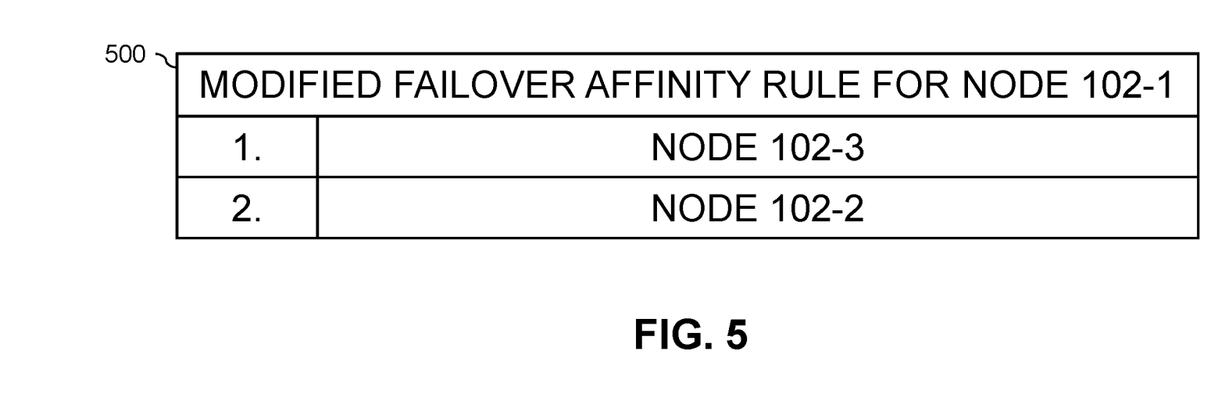
FIG. 5 is an illustration of an example of a modified affinity rule for the first node failover in an illustrative embodiment.
Figure 6:
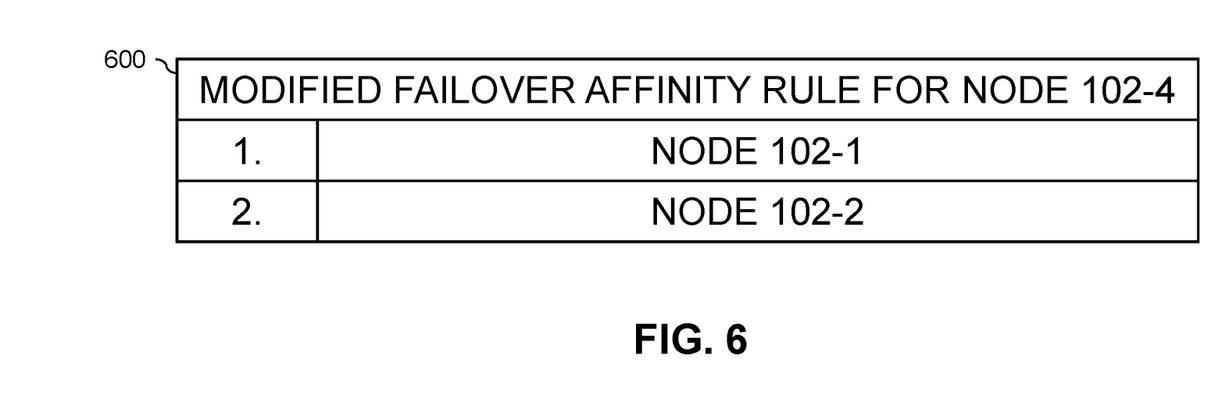
FIG. 6 is an illustration of an example of a modified affinity rule for the second node failover in an illustrative embodiment.

With reference now to FIGS. 5 and 6, example affinity rules 500 and 600 are shown that have been modified by the MPMA from affinity rules 300 and 400, respectively, due to the determination by the MPIO driver 112-2 of node 102-2 that network interface 202-3 is encountering performance issues and is considered to be flaky. For example, as seen from a comparison between the affinity rule 300 of FIG. 3 and the affinity rule 500 of FIG. 5, the order of the failover list for node 102-1 has been modified such that node 102-3 is first instead of node 102-2. As also seen from a comparison between the affinity rule 400 of FIG. 4 and the affinity rule 600 of FIG. 6, the order of the failover list for node 102-4 has been modified such that node 102-1 is first instead of node 102-2.

The modified affinity rules 136 may be provided by the MPMA to one or more of the MPIO drivers 112 for updating the affinity rules 220 on the corresponding nodes 102. In illustrative embodiments, the nodes 102 will propagate the modified affinity rules 136 to the other nodes 102, e.g., via the cluster management software 114 or directly. For example, the cluster management software 114 may be configured to obtain the modified affinity rules 136 from one or more of the corresponding nodes 102 and to propagate the modified affinity rules 136 to the other nodes 102.

In a case where the path status changes and there are no paths or network interfaces 202 encountering performance issues for that node 102 anymore, the MPIO driver 112 no longer considers the paths or network interfaces 202 to be flaky. This information is provided to the management device 130 and the MPMA reverts the modified affinity rules 136 for the nodes 102 to their original state, e.g., by returning the nodes 102 in the failover lists of the affinity rules to the original state as specified by the cluster management software 114. For example, the affinity rule for node 102-1 may be reverted from the modified affinity rule 500 back to the original affinity rule 300 with node 102-2 being the first failover option and the affinity rule for node 102-4 may be reverted from the modified affinity rule 600 back to the original affinity rule 400 with node 102-2 being the first failover option.

In a case where the path status for one of the paths changes, e.g., the path is no longer encountering performance issues, but one or more other paths or network interfaces 202 of that node 102 are still encountering performance issues, MPMA may re-rank the failover list based on the original affinity rules 220 or the modified affinity rules 136 and based on the status of the paths or network interfaces 202 that are still considered to be flaky. The modified affinity rules 136 having the re-ranked failover list may then be propagated to the other nodes 102 and the cluster management software 114 as described above. In a case where a particular node 102 no longer has performance issues but another node does have performance issues, the re-ranking may be performed based on this information.

In some embodiments, a determination by the MPMA to modify the affinity rules 220 by re-ranking the failover list may trigger an alert which is presented to an administrator associated with the MPMA, e.g., via a graphical user interface of the management interface 132 or any other graphical user interface associated with the management device 130, nodes 102 or any other component of the information processing system 100.

In some embodiments, the alert may indicate that the affinity rules have been modified due to path or network interface performance issues detected by one or more MPIO drivers 112. In such a case, the affinity rules are modified automatically without requiring further user intervention.

In some embodiments, the alert may alternatively suggest to the administrator options for modifying the affinity rules to overcome the performance issue. In such a case, the modification of the affinity rules may require user interaction such as, e.g., the receipt of an instruction from the administrator to modify the affinity rules according to one or more of the suggested options, e.g., via an input device or the graphical user interface.

The disclosed functionality for node failover provides clusters with cluster node failover that takes into account not only the priority assigned by the affinity rules to each node of the cluster for failover purposes but also which nodes have the most optimal environment for taking over the processing of applications from failed nodes. By utilizing this functionality, failover to underperforming nodes that are encountering performance issues with paths or network interfaces may be inhibited in favor of failover to healthier nodes that are not encountering such performance issues.

Illustrative embodiments of the techniques and functionality implemented by failover logic 134 in conjunction with the MPIO drivers 112 of the nodes 102 of a cluster will now be described in more detail with reference to the flow diagram of FIG. 7.

Figure 7:
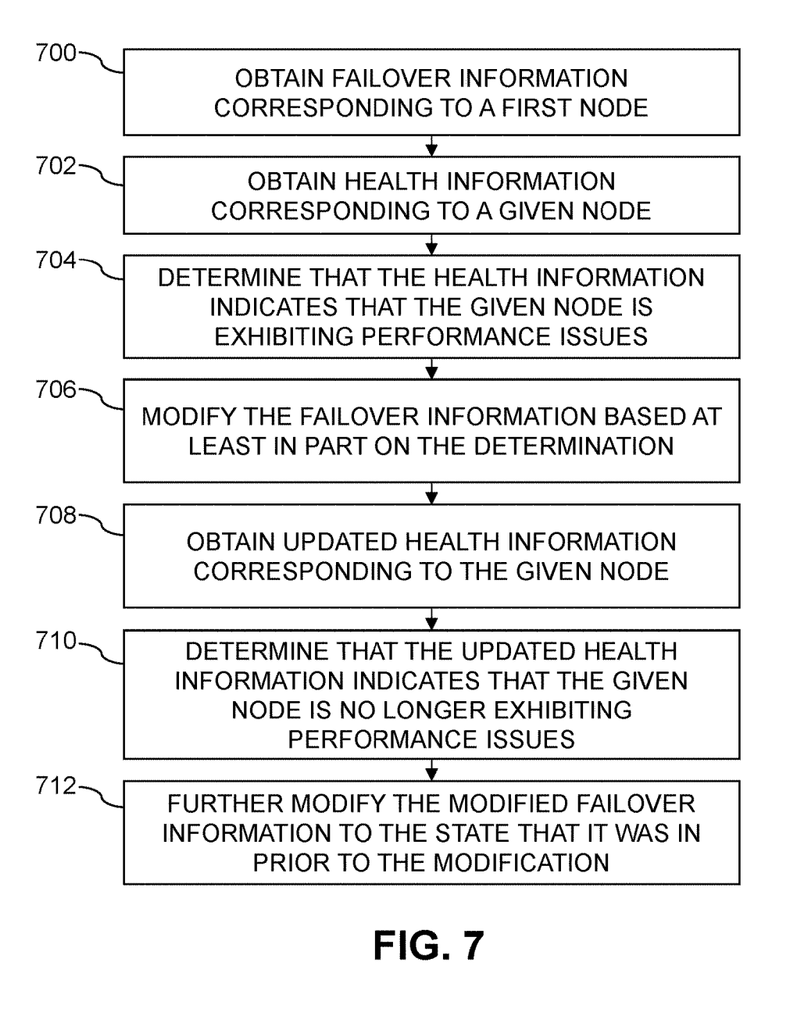
FIG. 7 is a flow diagram of an example process for node failover in an illustrative embodiment.

The process as shown in FIG. 7 includes steps 700 through 712, and is suitable for use in the information processing system 100 but is more generally applicable to other types of systems comprising multiple nodes and a shared storage system.

At step 700, failover logic 134 obtains failover information corresponding to a first node of a plurality of nodes. The failover information comprises an order in which other nodes of the plurality of nodes will be selected to handle the execution of an application executing on the first node in response to the first node becoming unavailable. For example, the failover information may comprise the affinity rules described above and may be obtained from any of the nodes 102 in the cluster.

At step 702, failover logic 134 obtains health information corresponding to a given node of the plurality of nodes. For example, the health information may be obtained from the MPIO driver 112-2 of the node 102-2 and may comprise the indication of whether or not a particular path or network interface 202 of the node 102-2 is flaky or encountering performance issues, as described above.

At step 704, failover logic 134 determines that the health information indicates that the given node is exhibiting performance issues, e.g., the paths or network interfaces are determined to be flaky or are encountering performance issues such as those described above.

At step 706, failover logic 134 modifies the failover information based at least in part on the determination that the health information indicates that the given node is exhibiting performance issues. For example, as described above, the MPMA of failover logic 134 may modify the affinity rules 220 for one or more of the nodes 102 in the cluster to generate modified affinity rules 136, e.g., as shown in FIGS. 3-6 and described above. For example, in the event of a failure of node 102-1, the modified affinity rule 500 of FIG. 5 will be utilized which results in a failover to node 102-3 instead of node 102-2 according to the modified affinity rule 500.

At step 708, failover logic 134 obtains updated health information corresponding to the given node, e.g., from MPIO driver 112-2 as described above.

At step 710, failover logic 134 determines that the updated health information indicates that the given node is no longer exhibiting performance issues, e.g., the paths or network interfaces of the given node are no longer flaky or having other performance issues.

At step 712, failover logic 134 further modifies the modified failover information based at least in part on the determination that the health information indicates that the given node is no longer exhibiting performance issues. For example, as described above, the MPMA of failover logic 134 may further modify the modified affinity rule for node 102-1 based on the updated health information, e.g., to return the modified affinity rule 500 to the original state of affinity rule 300 as shown in FIG. 3. In other cases, the affinity rule 500 may be further modified in view of the updated health information without reverting to the original affinity rule that was specified by the cluster management software 114, for example, if there are still performance issues with that node 102 or another of the nodes 102 that are listed in the affinity rules.

Separate instances of the process of FIG. 7 may be performed in respective additional management devices or nodes that share the storage array.

The particular processing operations and other system functionality described in conjunction with the flow diagrams of FIG. 7 are presented by way of illustrative example only, and should not be construed as limiting the scope of the disclosure in any way. Alternative embodiments can use other types of processing operations involving nodes, management device, storage systems and failover logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different failover logic arrangements within a given information processing system.

Functionality such as that described in conjunction with the flow diagram of FIG. 7 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for node failover are carried out at least in part under the control of failover logic 134. For example, failover logic 134 is illustratively configured to control performance of portions of the process shown in the flow diagram described above in conjunction with FIG. 7.

It is assumed that each of the other MPIO drivers 112 are configured in a manner similar to that described above and elsewhere herein for the first MPIO driver 112-1. The other nodes 102 of the system 100 are therefore also configured to communicate over the SAN 104 with the storage array 105, and the MPIO drivers 112 of such other nodes 102 are each similarly configured to select IO operations from a corresponding one of the sets of IO queues 110 for delivery to the storage array 105 over the SAN 104, and to perform at least a portion of the disclosed functionality for node failover. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support maintenance information sharing with nodes.

Although in some embodiments certain commands used by the nodes 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of the functionality for node failover as disclosed herein, node failover will be performed without considering performance issues that may be occurring on the target failover nodes.

Such drawbacks are advantageously overcome in illustrative embodiments herein by using failover logic 134 to implement the functionality for node failover as described above. For example, by providing the functionality for node failover, health information about performance issues of the nodes of the cluster may be leveraged to modify the order of the nodes in the affinity rules such that those nodes with performance issues have a lower priority for being selected for failover. This allows the cluster to inhibit the selection of nodes having performance issues in favor of those having better health information.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container nodes. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of nodes 102, SAN 104, storage array 105 and management device 130 are illustratively implemented in the form of software running on one or more processing devices. As a more particular example, the failover logic 134 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of nodes, networks, storage systems, storage arrays, storage devices, processors, memories, IO queues, MPIO drivers, failover logic and management devices. Also, the particular configurations of system and device elements and associated processing operations illustratively shown in the drawings can be varied in other embodiments. For example, a wide variety of different management device configurations and associated failover logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a processing device comprising a processor coupled to memory, the processing device being configured:
to obtain failover information corresponding to a first node of a plurality of nodes, each node of the plurality of nodes being configured to communicate with a storage system over a plurality of paths, the failover information comprising a failover node selection order according to which other nodes of the plurality of nodes are configured for selection in response to the first node becoming unavailable;
to obtain health information corresponding to a given node of the other nodes;
to determine that the health information indicates that the given node is exhibiting performance issues on at least one of the paths between the given node and the storage system; and
to modify the failover node selection order based at least in part on the determination that the health information indicates that the given node is exhibiting performance issues on the at least one of the paths.

2. The apparatus of claim 1 wherein the processing device is further configured to provide the modified failover node selection order to one or more of the plurality of nodes, the one or more of the plurality of nodes being configured to propagate the modified failover node selection order to at least some of the plurality of nodes.

3. The apparatus of claim 2 wherein providing the modified failover node selection order to one or more of the plurality of nodes comprises providing the modified failover node selection order to the given node, the given node being configured to propagate the modified failover node selection order to the at least some of the plurality of nodes.

4. The apparatus of claim 1 wherein the health information is obtained from a multi-path input-output driver of the given node, the multi-path input-output driver being configured:
to monitor a health of the paths between the given node and the storage system; and
to generate the health information based at least in part on the monitoring.

5. The apparatus of claim 1 wherein:
the failover information comprises a plurality of affinity rules, each affinity rule corresponding to a node of the plurality of nodes; and
the affinity rule that corresponds to the first node comprises the failover node selection order.

6. The apparatus of claim 1 wherein:
the failover node selection order in the obtained failover information comprises an indication that the given node is configured for selection ahead of a second node of the other nodes in response to the first node becoming unavailable; and
modifying the failover node selection order comprises modifying the failover node selection order such that the second node is configured for selection ahead of the given node.

7. The apparatus of claim 1 wherein the processing device is further configured:
to obtain updated health information corresponding to the given node;
to determine that the updated health information indicates that the given node is no longer exhibiting performance issues on the at least one of the paths between the given node and the storage system; and
to further modify the modified failover node selection order based at least in part on the determination that the updated health information indicates that the given node is no longer exhibiting performance issues on the at least one of the paths.

8. The apparatus of claim 7 wherein further modifying the modified failover node selection order comprises returning the modified failover node selection order to the state that it was in prior to the modification.

9. A method comprising:
obtaining failover information corresponding to a first node of a plurality of nodes, each node of the plurality of nodes being configured to communicate with a storage system over a plurality of paths, the failover information comprising a failover node selection order according to which other nodes of the plurality of nodes are configured for selection in response to the first node becoming unavailable;
obtaining health information corresponding to a given node of the other nodes;
determining that the health information indicates that the given node is exhibiting performance issues on at least one of the paths between the given node and the storage system; and
modifying the failover node selection order based at least in part on the determination that the health information indicates that the given node is exhibiting performance issues on the at least one of the paths;
wherein the method is implemented by a processing device comprising a processor coupled to a memory.

10. The method of claim 9 wherein the method further comprises providing the modified failover node selection order to one or more of the plurality of nodes, the one or more of the plurality of nodes being configured to propagate the modified failover node selection order to at least some of the plurality of nodes.

11. The method of claim 10 wherein providing the modified failover node selection order to one or more of the plurality of nodes comprises providing the modified failover node selection order to the given node, the given node being configured to propagate the modified failover node selection order to the at least some of the plurality of nodes.

12. The method of claim 9 wherein the health information is obtained from a multi-path input-output driver of the given node, the multi-path input-output driver being configured:
   to monitor a health of the paths between the given node and the storage system; and
   to generate the health information based at least in part on the monitoring.

13. The method of claim 9 wherein:
   the failover information comprises a plurality of affinity rules, each affinity rule corresponding to a node of the plurality of nodes; and
   the affinity rule that corresponds to the first node comprises the failover node selection order.

14. The method of claim 9 wherein:
   the failover node selection order in the obtained failover information comprises an indication that the given node is configured for selection ahead of a second node of the other nodes in response to the first node becoming unavailable; and
   modifying the failover node selection order comprises modifying the failover node selection order such that the second node is configured for selection ahead of the given node.

15. The method of claim 9 wherein the method further comprises:
   obtaining updated health information corresponding to the given node;
   determining that the updated health information indicates that the given node is no longer exhibiting performance issues on the at least one of the paths between the given node and the storage system; and
   further modifying the modified failover node selection order based at least in part on the determination that the updated health information indicates that the given node is no longer exhibiting performance issues on the at least one of the paths.

16. The method of claim 15 wherein further modifying the modified failover node selection order comprises returning the modified failover node selection order to the state that it was in prior to the modification.

17. A computer program product comprising a non-transitory processor-readable storage medium having stored therein program code of one or more software programs, wherein the program code, when executed by a processing device comprising a processor coupled to memory, causes the processing device:
   to obtain failover information corresponding to a first node of a plurality of nodes, each node of the plurality of nodes being configured to communicate with a storage system over a plurality of paths, the failover information comprising a failover node selection order according to which other nodes of the plurality of nodes are configured for selection in response to the first node becoming unavailable;
   to obtain health information corresponding to a given node of the other nodes;
   to determine that the health information indicates that the given node is exhibiting performance issues on at least one of the paths between the given node and the storage system; and
   to modify the failover node selection order based at least in part on the determination that the health information indicates that the given node is exhibiting performance issues on the at least one of the paths.

18. The computer program product of claim 17 wherein:
   the program code further causes the processing device to provide the modified failover node selection order to one or more of the plurality of nodes, the one or more of the plurality of nodes being configured to propagate the modified failover node selection order to at least some of the plurality of nodes; and
   providing the modified failover node selection order to one or more of the plurality of nodes comprises providing the modified failover node selection order to the given node, the given node being configured to propagate the modified failover node selection order to the at least some of the plurality of nodes.

19. The computer program product of claim 17 wherein:
   the failover node selection order in the obtained failover information comprises an indication that the given node is configured for selection ahead of a second node of the other nodes in response to the first node becoming unavailable; and
   modifying the failover node selection order comprises modifying the failover node selection order such that the second node is configured for selection ahead of the given node.

20. The computer program product of claim 17 wherein the program code further causes the processing device:
   to obtain updated health information corresponding to the given node;
   to determine that the updated health information indicates that the given node is no longer exhibiting performance issues on the at least one of the paths between the given node and the storage system; and
   to further modify the modified failover node selection order based at least in part on the determination that the updated health information indicates that the given node is no longer exhibiting performance issues on the at least one of the paths, wherein further modifying the modified failover node selection order comprises returning the modified failover node selection order to the state that it was in prior to the modification.

* * * * *